United States Patent
Fukunishi et al.

(10) Patent No.: US 10,135,099 B2
(45) Date of Patent: Nov. 20, 2018

(54) PULSED DISCHARGE DEVICE AND PULSED DISCHARGE METHOD

(71) Applicant: NEC Corporation, Tokyo (JP)

(72) Inventors: Hiroaki Fukunishi, Tokyo (JP); Kenji Kobayashi, Tokyo (JP); Suguru Watanabe, Tokyo (JP); Osamu Ishibashi, Tokyo (JP); Hiroshi Kajitani, Tokyo (JP); Kazuhisa Sunaga, Tokyo (JP); Hideyuki Sugita, Tokyo (JP); Atsumasa Sawada, Tokyo (JP); Ayami Tanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1 day.

(21) Appl. No.: 15/315,664

(22) PCT Filed: Apr. 22, 2015

(86) PCT No.: PCT/JP2015/062232
§ 371 (c)(1),
(2) Date: Dec. 1, 2016

(87) PCT Pub. No.: WO2015/186449
PCT Pub. Date: Dec. 10, 2015

(65) Prior Publication Data
US 2017/0200985 A1    Jul. 13, 2017

(30) Foreign Application Priority Data
Jun. 3, 2014   (JP) .................. 2014-114669

(51) Int. Cl.
*H02J 7/00*    (2006.01)
*H01M 10/44*   (2006.01)
*H01M 10/0525* (2010.01)

(52) U.S. Cl.
CPC ....... *H01M 10/44* (2013.01); *H01M 10/0525* (2013.01); *H02J 7/0063* (2013.01); *H02J 2007/0067* (2013.01)

(58) Field of Classification Search
CPC .. H01M 10/44; H01M 10/0525; H02J 7/0063; H02J 2007/0067
See application file for complete search history.

(56) References Cited

U.S. PATENT DOCUMENTS

| | | | |
|---|---|---|---|
| 6,336,056 B1 * | 1/2002 | Fujimoto | G05B 19/41865 700/121 |
| 2010/0097211 A1 * | 4/2010 | Silver | G08B 17/10 340/540 |

FOREIGN PATENT DOCUMENTS

| | | | | |
|---|---|---|---|---|
| EP | 2731225 A2 * | 5/2014 | | H02J 7/0063 |
| EP | 2731225 A2 | 5/2014 | | |

(Continued)

OTHER PUBLICATIONS

International Search Report, corresponding to PCT/JP2015/062232, dated Jul. 21, 2015, 2 pp.

*Primary Examiner* — Nha Nguyen
(74) *Attorney, Agent, or Firm* — Wilmer Cutler Pickering Hale and Dorr LLP

(57) ABSTRACT

A pulsed discharge device according to an exemplary aspect of the present invention includes a controller configured to determine an interruption time to a discharge time based on a predetermined time ratio between the discharge time and the interruption time when performing a pulsed discharge to repeat alternately a discharge and a pause in discharging of a chemical battery.

20 Claims, 8 Drawing Sheets

(56) References Cited

FOREIGN PATENT DOCUMENTS

| | | |
|---|---|---|
| JP | 2001-314043 A | 11/2001 |
| JP | 2004-171864 A | 6/2004 |
| JP | 2012-506124 A | 3/2012 |
| JP | 2014-99972 | 5/2014 |
| WO | WO-2010/044883 A2 | 4/2010 |

* cited by examiner

| TIME RATIO |
|---|
| 4 |
| 5 |

PULSED DISCHARGE DEVICE AND PULSED DISCHARGE METHOD

CROSS-REFERENCE TO RELATED APPLICATIONS

This application is a national stage application of International Application No. PCT/JP2015/062232 entitled "Pulsed Discharged Device and Pulsed Discharge Method," filed on Apr. 22, 2015, which claims the benefit of priority from Japanese Patent Application No. 2014/114669, filed on Jun. 3, 2014, the disclosures of which are incorporated herein in their entirety by reference.

TECHNICAL FIELD

The present invention relates to a pulsed discharge device that performs a pulsed discharge and a pulsed discharge method.

BACKGROUND ART

In general, if a continuous discharge is performed using chemical batteries as typified by lithium-ion batteries, a dischargeable electric capacity becomes smaller as a current value becomes larger. As an operation method for reducing such a decrease in the dischargeable electric capacity at a large current, a pulsed discharge has been considered in which a discharge and a pause in discharging are alternately repeated (see Patent Literature 1, for example). The pulsed discharge device using the method controls, based on two independent variables of a discharge time X and an interruption time Y, the discharged capacity A (X, Y). To control the discharged capacity, Y is used that is determined so as to recover 70% or more of an open circuit voltage based on a predetermined optimum combination of X and Y or a measured voltage condition obtained by measuring a voltage condition during discharge.

CITATION LIST

Patent Literature

[PTL 1] Japanese Unexamined Patent Application Publication No. 2004-171864

SUMMARY OF INVENTION

Technical Problem

There has been the problem that a circuit becomes complex to obtain an optimum interruption time Y for any discharge time X according to the operation method described in Patent Literature 1.

The object of the present invention is to provide a pulsed discharge device and a pulsed discharge method that solve the above-mentioned problem.

Solution to Problem

A pulsed discharge device according to an exemplary aspect of the present invention includes a controller configured to determine an interruption time to a discharge time based on a predetermined time ratio between the discharge time and the interruption time when performing a pulsed discharge to repeat alternately a discharge and a pause in discharging of a chemical battery.

A pulsed discharge method according to an exemplary aspect of the present invention includes performing a process of determining an interruption time to a discharge time based on a predetermined time ratio between the discharge time and the interruption time when performing a pulsed discharge to repeat alternately a discharge and a pause in discharging of a chemical battery.

Advantageous Effects of Invention

As described above, the present invention makes it possible to easily set an optimum interruption time for any discharge time.

DESCRIPTION OF EMBODIMENTS

Example embodiments of the present invention will be described with reference to the drawings below.

A First Example Embodiment

Figure 1:
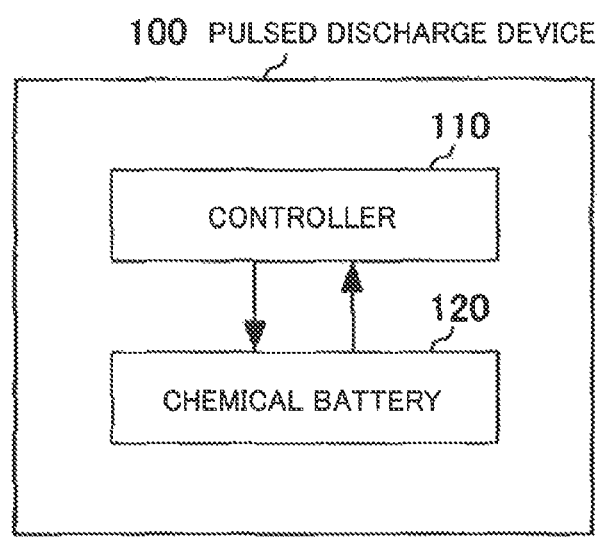
FIG. 1 illustrates a pulsed discharge device in accordance with a first example embodiment of the present invention.

FIG. 1 illustrates a pulsed discharge device in accordance with a first example embodiment of the present invention.

As illustrated in FIG. 1, the pulsed discharge device 100 in accordance with the present example embodiment includes a controller 110 and a chemical battery 120. FIG. 1 illustrates examples of major elements with regard to the present example embodiment among the elements included in the pulsed discharge device 100 in the embodiment.

The controller 110 controls a pulsed discharge in which a discharge and a pause in discharging of the chemical battery 120 are alternately repeated. On this occasion, the controller 110 determines an interruption time to a discharge time based on a predetermined time ratio between the discharge time and the interruption time.

The chemical battery 120 is a battery cell that discharges under the control of the controller 110.

A pulsed discharge method in the pulsed discharge device 100 illustrated in FIG. 1 will be described below.

Figure 2:
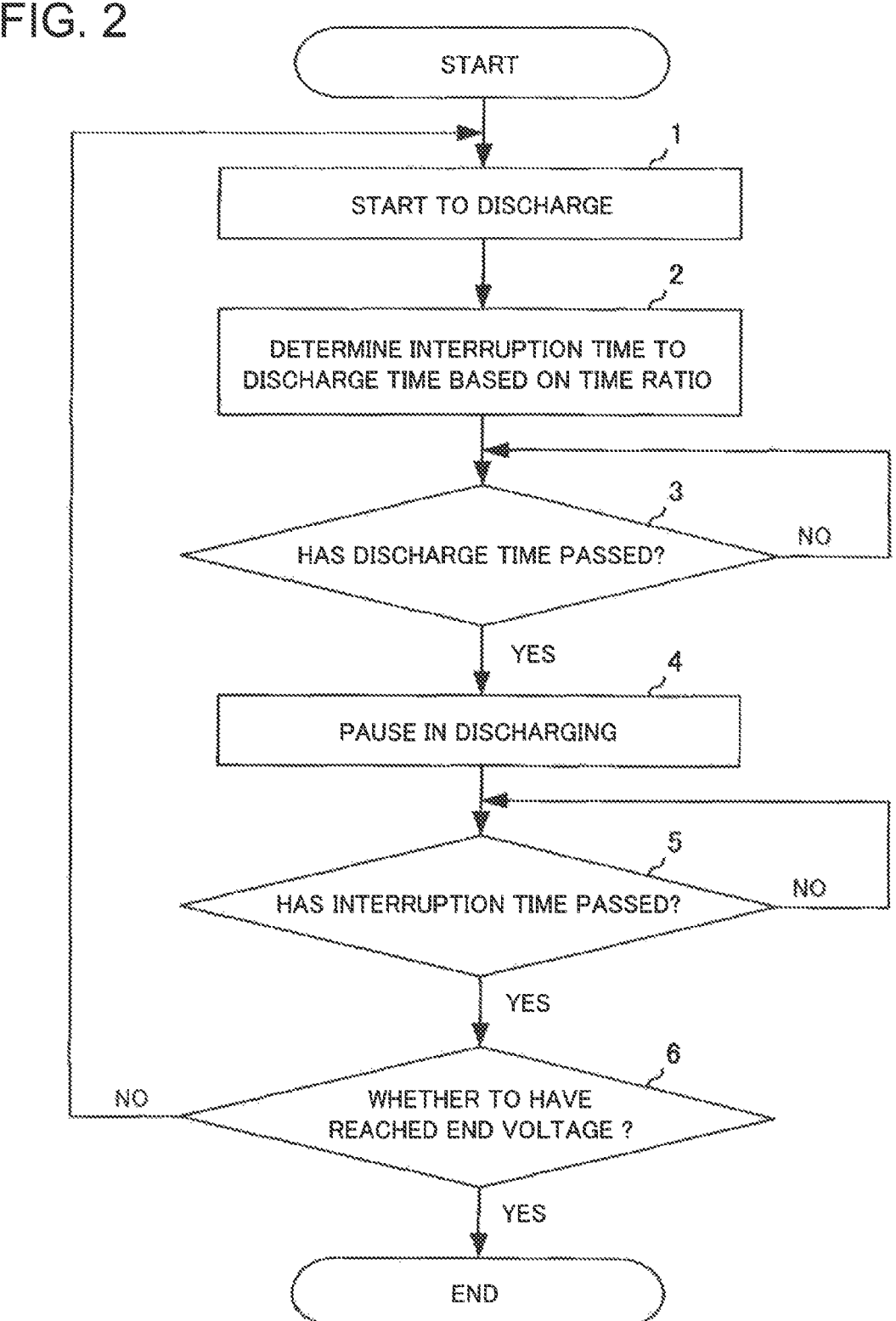
FIG. 2 is a flowchart to describe an example of a pulsed discharge method in the pulsed discharge device illustrated in FIG. 1.

FIG. 2 is a flowchart to describe an example of pulsed discharge methods in the pulsed discharge device 100 illustrated in FIG. 1.

First, the controller 110 makes the chemical battery 120 start to discharge in Step 1. Then the controller 110 determines an interruption time to a discharge time based on a time ratio between the discharge time and the interruption time in Step 2. The time ratio is predetermined based on the characteristics of the chemical battery 120, for example.

Subsequently, the controller 110 determines in Step 3 whether the discharge time has passed since the discharge started. If the discharge time has passed since the discharge started, the controller 110 causes a pause in the discharge of the chemical battery 120 in Step 4.

Subsequently, the controller 110 determines in Step 5 whether the interruption time determined in Step 2 has passed since the pause in the discharge. If the interruption time has passed since the pause in the discharge, the controller 110 determines in Step 6 whether to have reached a predetermined end voltage.

When having reached the end voltage, the process is completed. When not having reached the end voltage, the controller 110 makes the chemical battery 120 start to discharge in Step 1 again.

The controller 110 thus determines the interruption time to the discharge time using a predetermined time ratio; therefore, it becomes possible to utilize a device with a battery flexibly without being restricted by the discharge time.

A Second Example Embodiment

Figure 3:
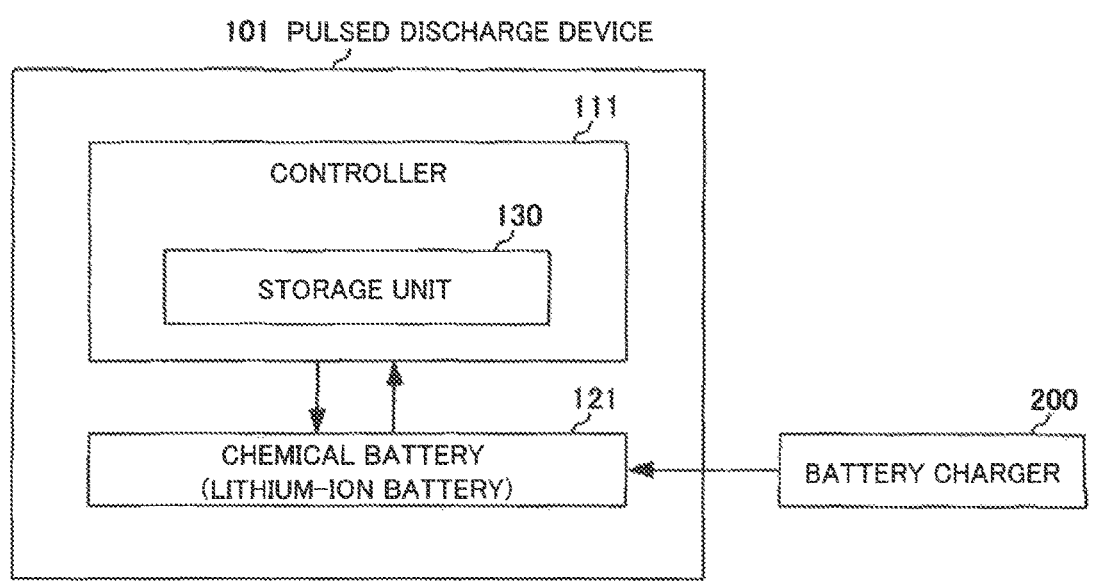
FIG. 3 illustrates a pulsed discharge device in accordance with a second example embodiment of the present invention.

FIG. 3 illustrates a pulsed discharge device in accordance with a second example embodiment of the present invention.

A pulsed discharge device 101 in the present example embodiment includes a controller 111 and a chemical battery 121 as illustrated in FIG. 2. A battery charger 200 to charge the chemical battery 121 is configured so as to be connected to the pulsed discharge device 101. FIG. 3 illustrates examples of major elements with regard to the present example embodiment among the elements included in the pulsed discharge device 101 in the embodiment. In other words, the other elements included in the pulsed discharge device 101 in the present example embodiment may be elements included in a conventional pulsed discharge device and are not particularly specified here.

The controller 111 controls a pulsed discharge in which a discharge and a pause in discharging of the chemical battery 121 are alternately repeated. The controller 111 includes a storage unit 130. The storage unit 130 is a storage such as a hard disk that stores in advance a time ratio of an interruption time to a discharge time of the chemical battery 121. The time ratio is an optimum ratio between the discharge time and the interruption time to reduce a decrease in the discharged capacity or an increase in the cell temperature of the chemical battery 121 and is determined in advance by an experiment, measurement, and the like.

Figure 4:
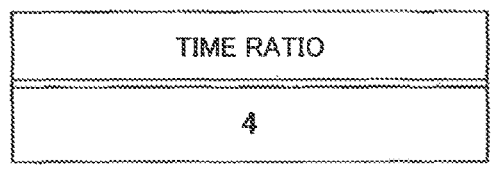
FIG. 4 illustrates an example of a time ratio stored in a storage unit illustrated in FIG. 3.

FIG. 4 illustrates an example of a time ratio stored in the storage unit 130 illustrated in FIG. 3.

The time ratio "4" of the interruption time to the discharge time is set and stored in advance in the storage unit 130 illustrated in FIG. 3 as illustrated in FIG. 4. A method for determining a value of the time ratio will be described below using an example.

The method for determining the time ratio to be described below is based on the results obtained from performing cell simulations using the pseudo-two-dimension (P2D) model (see M. Doyle, T. F. Fuller, and J. Newman, J. Electrochem, Soc., 140, 1526 (1993).). The P2D model is a physicochemical model based on the electrochemical reaction theory and makes it possible to analyze the behavior inside a battery cell associated with the charge and discharge with a high degree of accuracy. The battery cell re-created by the simulation is composed of a positive-electrode active material consisting primarily of Spinel-type lithium manganese composite oxide and a negative-electrode active material consisting primarily of carbon material, and its rating capacity is 32.5 Ah. The pulsed discharge of discharge and interruption is performed with a voltage between 4.2 and 3.0 V, a discharge current of 250 A, and an environmental temperature equal to room temperature (25° C.).

Figure 5:
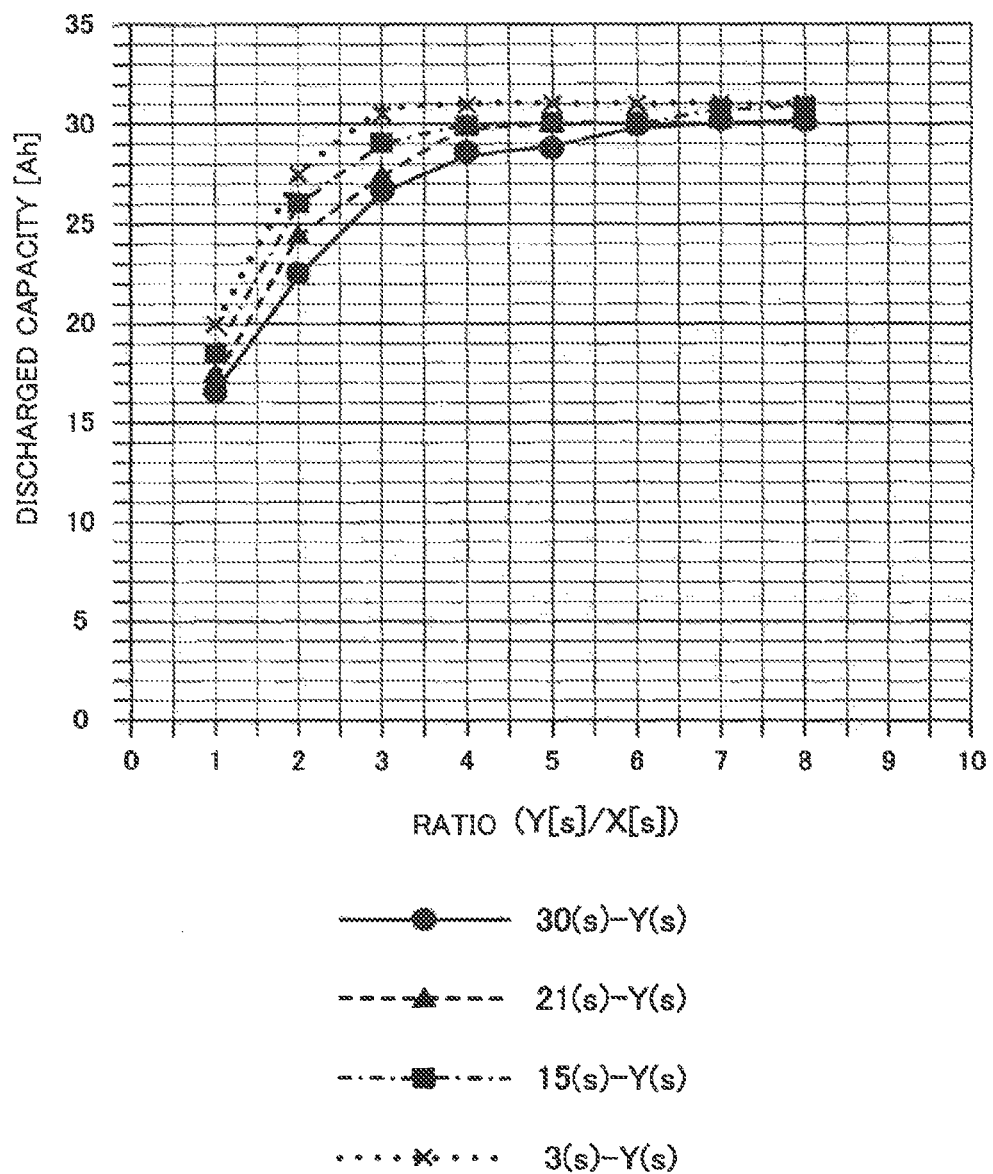
FIG. 5 is a graph illustrating the relations between a discharged capacity (Ah) and a time ratio of the ratio of an interruption time Y (s) to a discharge time X (s) with regard to four patterns of X (s)=3 (s), 15 (s), 21 (s), and 30 (s).

FIG. 5 is a graph illustrating the relations between the discharged capacity (Ah) and the time ratio of the ratio of the interruption time Y (s) to the discharge time X (s) with regard to four patterns of X (s)=3 (s), 15 (s), 21 (s), and 30 (s). The discharged capacity here is equal to the electrical capacity that has been discharged until reaching the end voltage of 3 V.

It turns out from the graphs illustrated in FIG. 5 that these four patterns denote the same tendency with each other. Each dischargeable electric capacity of the four patterns increases as the time ratio becomes larger. In particular, it is possible to discharge 30 Ah or more (92% or more of the rating capacity) at the time ratio of four or more. From these results, the value of "4 or more" is set as the time ratio in the storage unit 130.

Figure 6:
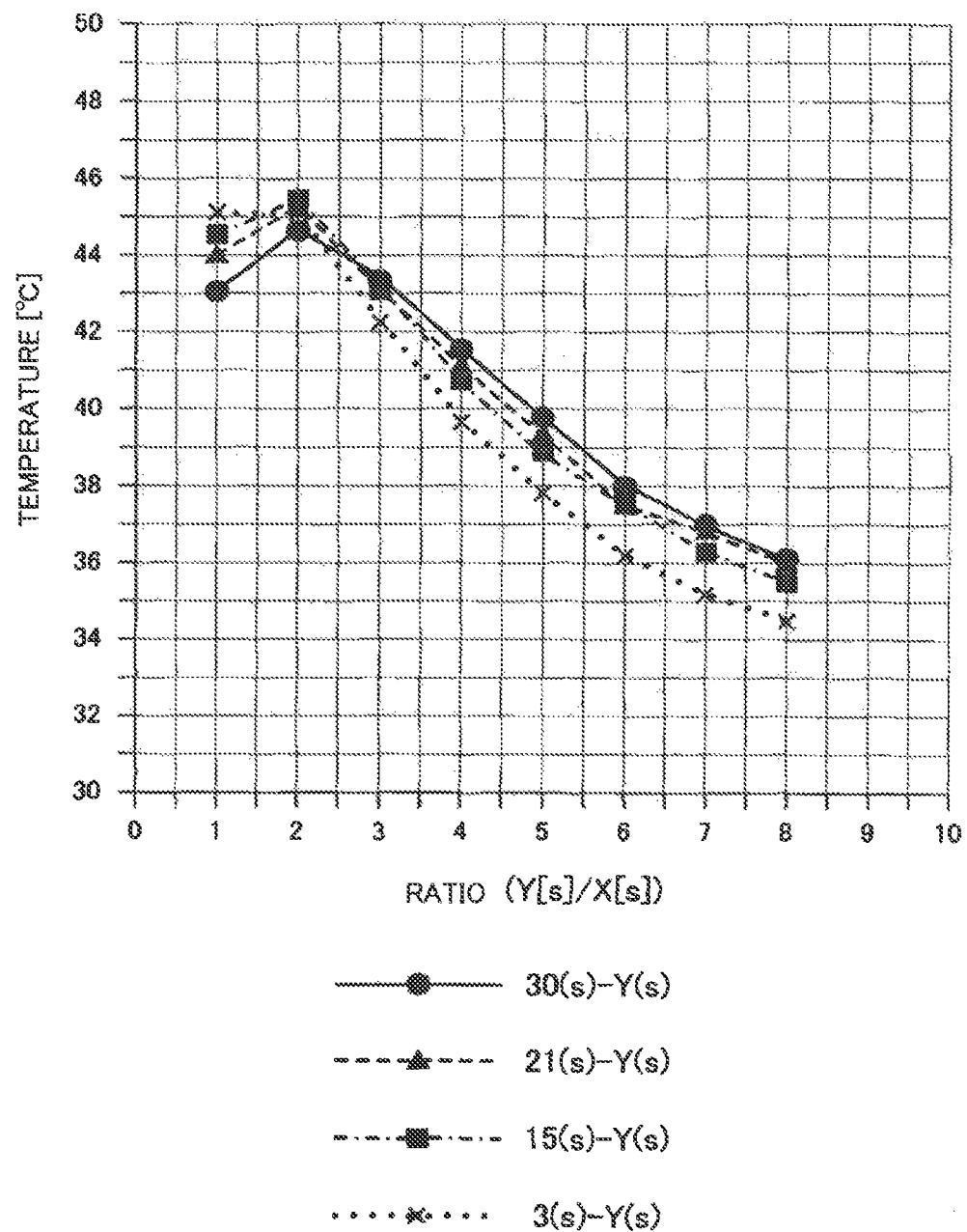
FIG. 6 is a graph illustrating the relations between a cell temperature (° C.) and a time ratio of the ratio of an interruption time Y (s) to a discharge time X (s) with regard to four patterns of X (s)=3 (s), 15 (s), 21 (s), and 30 (s).

FIG. 6 is a graph illustrating the relations between a cell temperature (° C.) and the time ratio of the ratio of the interruption time Y (s) to the discharge time X (s) with regard to four patterns of X (s)=3 (s), 15 (s), 21 (s), and 30 (s). The relations are obtained from the measurement results with the environmental temperature equal to room temperature (25° C.).

It turns out from the graphs illustrated in FIG. 6 that these four patterns denote the same tendency with each other. Each cell temperature of the four patterns falls as the time ratio becomes larger than two. In particular, it is possible to discharge at the cell temperature below 40° C. when the time ratio is equal to or more than five. From these results, the value of "5 or more" is set in the storage unit 130 as the time ratio with the environmental temperature equal to room temperature (25° C.).

The controller 111 determines the interruption time to the discharge time based on the time ratio stored in the storage unit 130. Specifically, the controller 111 reads the time ratio from the storage unit 130 and determines the interruption time by multiplying the time ratio read out and an arbitrary discharge time together.

The chemical battery 121 is a battery cell that discharges under the control of the controller 111. The chemical battery 121 may be a lithium-ion battery.

A pulsed discharge method in the pulsed discharge device 101 illustrated in FIG. 3 will be described below.

Figure 7:
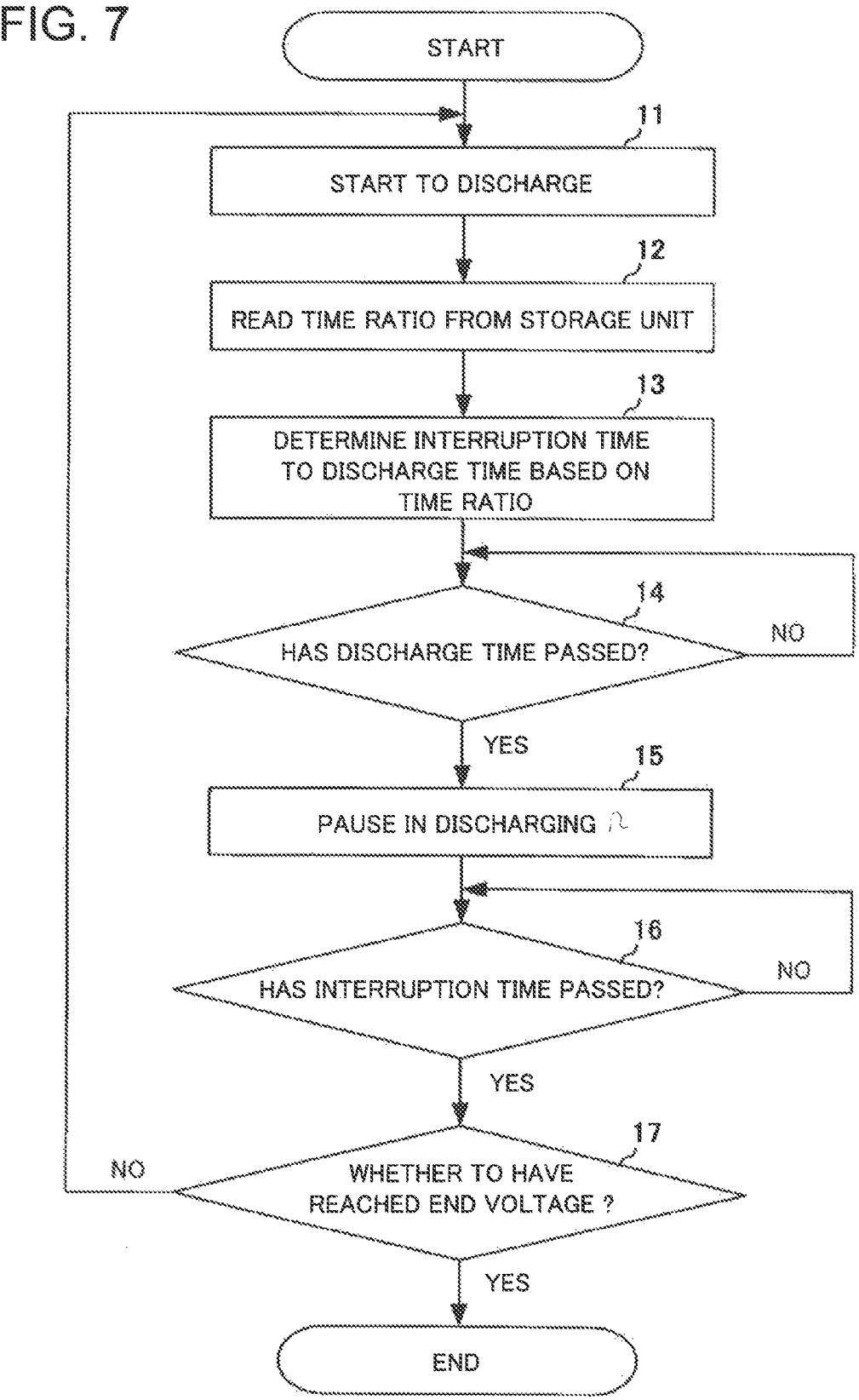
FIG. 7 is a flowchart to describe a pulsed discharge method in the pulsed discharge device illustrated in FIG. 3.

FIG. 7 is a flowchart to describe a pulsed discharge method in the pulsed discharge device 101 illustrated in FIG. 3.

First, the controller 111 makes the chemical battery 121 start to discharge in Step 11. Then the controller 111 reads a time ratio from the storage unit 130 in Step 12. The controller 111 then determines in Step 13 an interruption time to a discharge time based on the time ratio read from the storage unit 130.

Subsequently, the controller 111 determines in Step 14 whether the discharge time has passed since the discharge started. If the discharge time has passed since the discharge started, the controller 111 causes a pause in the discharge of the chemical battery 121 in Step 15.

Subsequently, the controller 111 determines in Step 16 whether the interruption time determined in Step 13 has passed since the pause in the discharge. If the interruption time has passed since the pause in the discharge, the controller 111 determines in Step 17 whether to have reached a predetermined end voltage.

When having reached the end voltage, the process is completed. When not having reached the end voltage, the controller 111 makes the chemical battery 121 start to discharge in Step 11 again.

If the discharge process has been completed, the battery charge starts at an arbitrary timing using the battery charger 200, and the chemical battery 121 is returned to the charging condition where it can perform a pulsed discharge.

A pulsed discharge method in the pulsed discharge device 101 illustrated in FIG. 3 will be described taking as an example a case where a time ratio of "4" has been set in the storage unit 130 using the results illustrated in FIG. 5.

When the discharge time is equal to 30 seconds, the controller 111 makes a determination that the interruption time is equal to a value of "120 seconds" that is obtained by multiplying the discharge time of "30 seconds" and the time ratio of "4" read from the storage unit 130 together. When 30 seconds have passed since the discharge started, the controller 111 causes a pause in the discharge of the chemical battery 121 for 120 seconds. After that, the controller 111 repeats the discharge for 30 seconds and the interruption for 120 seconds until the voltage of the chemical battery 121 reaches the end voltage of 3 V. This ensures that the discharged capacity is equal to or more than 30 Ah (92% or more of the rating capacity).

A pulsed discharge method in the pulsed discharge device 101 illustrated in FIG. 3 will be described taking as an example a case where a time ratio of "5" has been set in the storage unit 130 using the results illustrated in FIG. 6.

When the discharge time is equal to 30 seconds, the controller 111 makes a determination that the interruption time is equal to a value of "150 seconds" that is obtained by multiplying the discharge time of "30 seconds" and the time ratio of "5" read from the storage unit 130 together. When 30 seconds have passed since the discharge started, the controller 111 causes a pause in the discharge of the chemical battery 121 for 150 seconds. After that, the controller 111 repeats the discharge for 30 seconds and the interruption for 150 seconds until the voltage of the chemical battery 121 reaches the end voltage of 3 V. This ensures that a cell temperature is equal to or lower than 40° C. with the environmental temperature equal to room temperature (25° C.).

The controller 111 may determine the interruption time using a value larger than the time ratio read out instead of using the time ratio read from the storage unit 130 without change. As a variation, the storage unit 130 may store a time ratio of the discharge time to the interruption time. In this case, the controller 111 makes a determination that the interruption time is equal to a value obtained by multiplying the reciprocal of the time ratio and the discharge time together.

As described above, the controller 111 determines the interruption time to the discharge time using a predetermined time ratio as a value by which to reduce a decrease in the discharged capacity or an increase in the cell temperature. This makes it possible to easily set an optimum interruption time for any discharge time; therefore, it becomes possible to utilize a device with a battery flexibly without being restricted by the discharge time.

A Third Example Embodiment

Figures 8, 9:
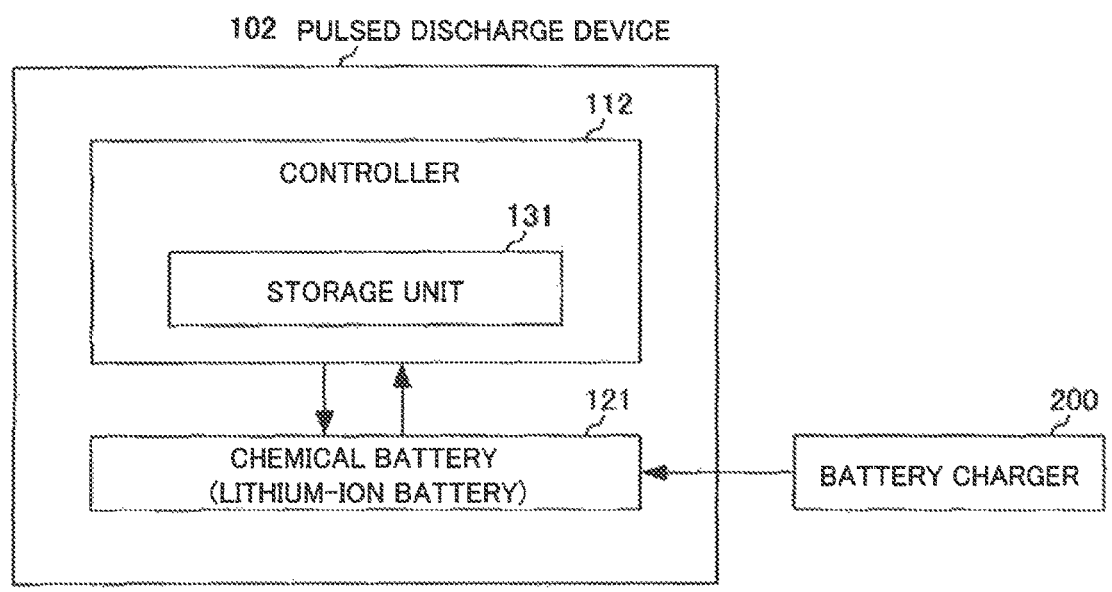
FIG. 8 illustrates a pulsed discharge device in accordance with a third example embodiment of the present invention.
FIG. 9 illustrates an example of a time ratio stored in a storage unit illustrated in FIG. 8.

FIG. 8 illustrates a pulsed discharge device in accordance with a third example embodiment of the present invention.

A pulsed discharge device 102 in the present example embodiment includes a controller 112 and a chemical battery 121 as illustrated in FIG. 8. A battery charger 200 to charge the chemical battery 121 is configured so as to be connected to the pulsed discharge device 102. FIG. 8 illustrates examples of major elements with regard to the present example embodiment among the elements included in the pulsed discharge device 102 in the embodiment. In other words, the other elements included in the pulsed discharge device 102 in the present example embodiment may be elements included in a conventional pulsed discharge device and are not particularly specified here.

The controller 112 controls a pulsed discharge in which a discharge and a pause in discharging of the chemical battery 121 are alternately repeated. The controller 112 includes a storage unit 131. The storage unit 131 is a storage such as a hard disk that stores in advance a time ratio of an interruption time to a discharge time of the chemical battery 121. The time ratio is an optimum ratio between the discharge time and the interruption time to reduce a decrease in the discharged capacity of the chemical battery 121 and an optimum ratio between the discharge time and the interruption time to reduce an increase in a cell temperature, and is determined in advance by an experiment, measurement, and the like.

FIG. 9 illustrates an example of the time ratios stored in the storage unit 131 illustrated in FIG. 8.

The time ratios "4" and "5" of the interruption time to the discharge time are set and stored in advance in the storage unit 131 illustrated in FIG. 8 as illustrated in FIG. 9. The time ratio "4" is a value by which to reduce a decrease in the discharged capacity, as described above referring to FIG. 5. The time ratio "5" is a value by which to reduce an increase in the cell temperature, as described above referring to FIG. 6. In this way, the storage unit 131 stores two kinds of time ratios.

The controller 112 determines the interruption time to the discharge time based on the larger time ratio between the plurality of time ratios stored in the storage unit 131. Specifically, the controller 112 reads the time ratios from the storage unit 131 and selects the larger time ratio from the time ratios read out. The controller 112 then determines the interruption time by multiplying the selected time ratio and an arbitrary discharge time together.

The chemical battery 121 is a battery cell that discharges under the control of the controller 112. The chemical battery 121 may be a lithium-ion battery.

A pulsed discharge method in the pulsed discharge device 102 illustrated in FIG. 8 will be described below.

Figure 10:
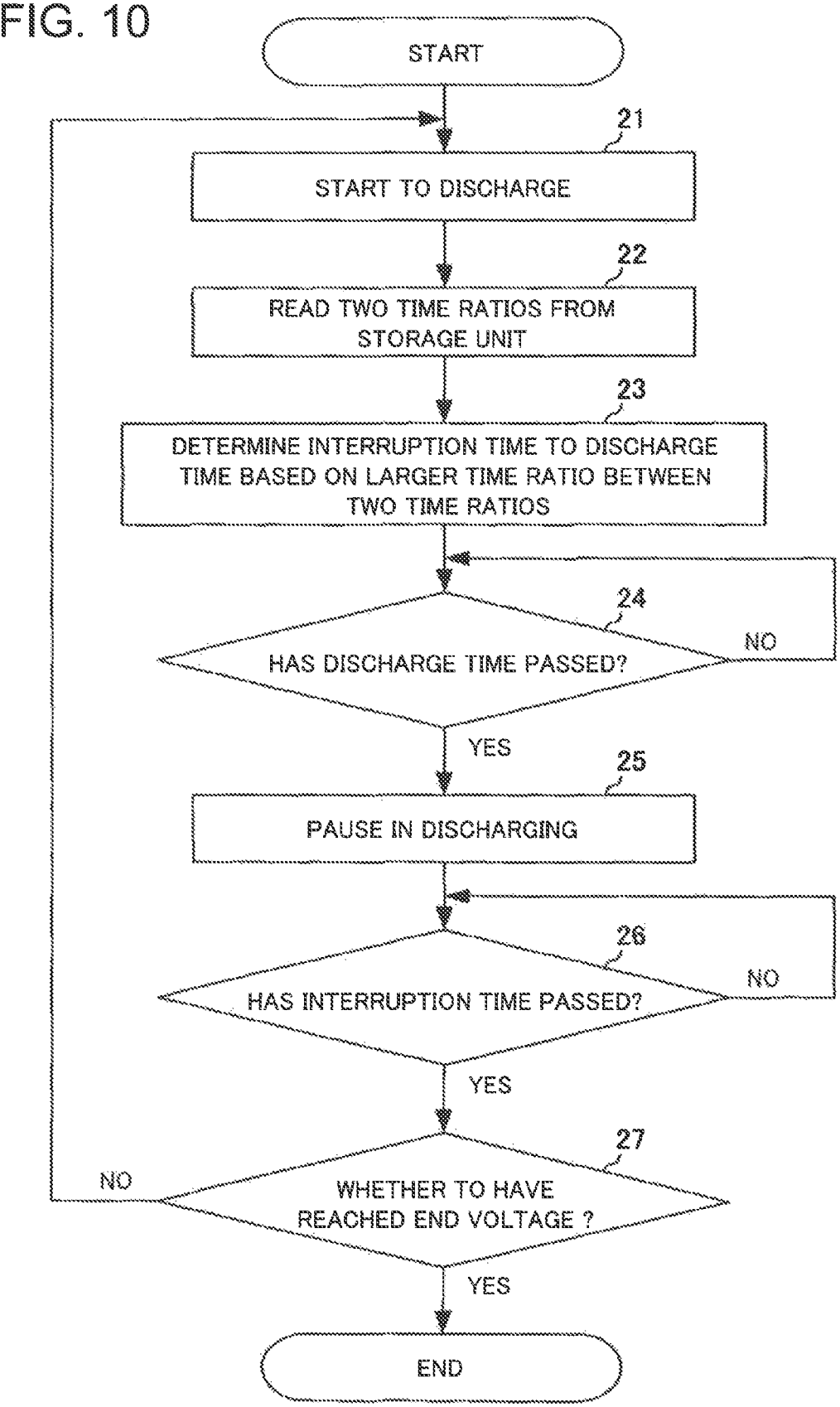
FIG. 10 is a flowchart to describe a pulsed discharge method in the pulsed discharge device illustrated in FIG. 8.

FIG. 10 is a flowchart to describe a pulsed discharge method in the pulsed discharge device 102 illustrated in FIG. 8.

First, the controller 112 makes the chemical battery 121 start to discharge in Step 21. Then the controller 112 reads the time ratios from the storage unit 131 in Step 22. Since the storage unit 131 stores two time ratios as illustrated in FIG. 9, the controller 112 reads these two time ratios from the storage unit 131. The controller 112 selects the time ratio with a larger value from the time ratios read out. The controller 112 then determines in Step 23 the interruption time to the discharge time based on the selected time ratio.

Subsequently, the controller 112 determines in Step 24 whether the discharge time has passed since the discharge started. If the discharge time has passed since the discharge started, the controller 112 causes a pause in the discharge of the chemical battery 121 in Step 25.

Subsequently, the controller 112 determines in Step 26 whether the interruption time determined in Step 23 has passed since the pause in the discharge. If the interruption time has passed since the pause in the discharge, the controller 112 determines in Step 27 whether to have reached a predetermined end voltage.

When having reached the end voltage, the process is completed. When not having reached the end voltage, the controller 112 makes the chemical battery 121 start to discharge in Step 21 again.

If the discharge process has been completed, the battery charge starts at an arbitrary timing using the battery charger 200, and the chemical battery 121 is returned to the charging condition where it can perform a pulsed discharge.

A pulsed discharge method in the pulsed discharge device 102 illustrated in FIG. 8 will be described taking as an example a case where the time ratios of "4" and "5" have been set in the storage unit 131 using the results illustrated in FIG. 5 and FIG. 6.

The controller 112 selects the larger value of "5" from the time ratios stored in the storage unit 131. When the discharge time is equal to 30 seconds, the controller 112 makes a determination that the interruption time is equal to a value of "150 seconds" that is obtained by multiplying the discharge time of "30 seconds" and the selected time ratio of "5" together. When 30 seconds have passed since the discharge started, the controller 112 causes a pause in the discharge of the chemical battery 121 for 150 seconds. After that, the controller 112 repeats the discharge for 30 seconds and the interruption for 150 seconds until the voltage of the chemical battery 121 reaches the end voltage of 3 V. This ensures that the discharged capacity is equal to or more than 30 Ah (92% or more of the rating capacity), and that a cell temperature is equal to or lower than 40° C. with the environmental temperature equal to room temperature (25° C.).

The controller 112 may determine the interruption time using a value larger than the time ratio read out instead of using the selected time ratio without change. As a variation, the storage unit 131 may store a time ratio of the discharge time to the interruption time. In this case, the controller 111 selects the time ratio with a smaller value from the time ratios stored in the storage unit 131, and makes a determination that the interruption time is equal to a value obtained by multiplying the reciprocal of the selected time ratio and the discharge time together.

As described above, the controller 112 determines the interruption time to the discharge time using the time ratio with a larger value between the time ratios stored in the storage unit 131. Accordingly, it is possible to determine the interruption time to the discharge time using the time ratio by which to reduce a decrease in the discharged capacity and an increase in the cell temperature. This makes it possible to easily set an optimum interruption time for any discharge time; therefore, it becomes possible to utilize a device with a battery flexibly without being restricted by the discharge time.

The process performed by each element included in the above-mentioned pulsed discharge devices 100-102 may be performed by a logic circuit fabricated for each purpose.

Alternatively, the process may be performed by storing a computer program (referred to a program, hereafter) in which processing details are described as procedures in a recording medium readable by each of the pulsed discharge devices 100-102, loading the program stored in the recording medium into each of the pulsed discharge devices 100-102, and executing the program. The recording medium readable by each of the pulsed discharge devices 100-102 includes a removable recording medium such as a floppy (registered trademark) disk, a magneto-optical disk, a DVD (Digital Versatile Disk), and a CD (Compact Disc), a memory such as a ROM (Read Only Memory) and a RAM (Random Access Memory) embedded in each of the pulsed discharge devices 100-102, and a HDD (Hard Disk Drive). The program recorded in such a recording medium is loaded into a CPU (Central Processing Unit) such as a controller included in each of the pulsed discharge devices 100-102, and a process similar to the above is performed by the control of the CPU. Here, the CPU operates as a computer that executes the program loaded from the recording medium that records the program.

The whole or part of the example embodiments disclosed above can be described as, but not limited to, the following supplementary notes.

(Supplementary Note 1)

A pulsed discharge device, comprising: a controller configured to determine an interruption time to a discharge time based on a predetermined time ratio between the discharge time and the interruption time when performing a pulsed discharge to repeat alternately a discharge and a pause in discharging of a chemical battery.

(Supplementary Note 2)

The pulsed discharge device according to Supplementary note 1, wherein the controller includes a storage unit configured to store the time ratio in advance.

(Supplementary Note 3)

The pulsed discharge device according to Supplementary note 1 or 2, wherein the time ratio is a value to reduce a decrease in discharged capacity.

(Supplementary Note 4)

The pulsed discharge device according to Supplementary note 3, wherein the time ratio is a ratio of the interruption time to the discharge time and is not less than four.

(Supplementary Note 5)

The pulsed discharge device according to Supplementary note 1 or 2, wherein the time ratio is a value to reduce an increase in a cell temperature.

(Supplementary Note 6)

The pulsed discharge device according to Supplementary note 5, wherein the time ratio is a ratio of the interruption time to the discharge time and is not less than five.

(Supplementary Note 7)

The pulsed discharge device according to Supplementary note 1 or 2, wherein the time ratio is a value to reduce a decrease in discharged capacity and an increase in a cell temperature.

(Supplementary Note 8)

The pulsed discharge device according to any one of Supplementary notes 1, 2, 3, 4, 5, 6, and 7, wherein the chemical battery is a lithium-ion battery.

(Supplementary Note 9)

A pulsed discharge method, comprising: performing a process of determining an interruption time to a discharge time based on a predetermined time ratio between the discharge time and the interruption time when performing a pulsed discharge to repeat alternately a discharge and a pause in discharging of a chemical battery.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-114669, filed on Jun. 3, 2014, the disclosure of which is incorporated herein in its entirety by reference.

The invention claimed is:

1. A pulsed discharge device, comprising:
a controller configured to determine an interruption time to a discharge time based on a predetermined time ratio between the discharge time and the interruption time when performing a pulsed discharge to repeat alternately a discharge and a pause in discharging of a chemical battery, wherein the time ratio includes a plurality of time ratios that differ in type; and
the controller is further configured to determine the interruption time based on a larger time ratio between the plurality of time ratios.

2. The pulsed discharge device according to claim 1, wherein the controller includes a storage unit configured to store the time ratio in advance.

3. The pulsed discharge device according to claim 2, wherein the time ratio is a value to reduce a decrease in discharged capacity.

4. The pulsed discharge device according to claim 3, wherein the time ratio is a ratio of the interruption time to the discharge time and is not less than four.

5. The pulsed discharge device according to claim 2, wherein the time ratio is a value to reduce an increase in a cell temperature.

6. The pulsed discharge device according to claim 5, wherein the time ratio is a ratio of the interruption time to the discharge time and is not less than five.

7. The pulsed discharge device according to claim 2, wherein the time ratio is a value to reduce a decrease in discharged capacity and an increase in a cell temperature.

8. The pulsed discharge device according to claim 2, wherein the chemical battery is a lithium-ion battery.

9. The pulsed discharge device according to claim 1, wherein the time ratio is a value to reduce a decrease in discharged capacity.

10. The pulsed discharge device according to claim 9, wherein the time ratio is a ratio of the interruption time to the discharge time and is not less than four.

11. The pulsed discharge device according to claim 10, wherein the chemical battery is a lithium-ion battery.

12. The pulsed discharge device according to claim 9, wherein the chemical battery is a lithium-ion battery.

13. The pulsed discharge device according to claim 1, wherein the time ratio is a value to reduce an increase in a cell temperature.

14. The pulsed discharge device according to claim 13, wherein the time ratio is a ratio of the interruption time to the discharge time and is not less than five.

15. The pulsed discharge device according to claim 14, wherein the chemical battery is a lithium-ion battery.

16. The pulsed discharge device according to claim 13, wherein the chemical battery is a lithium-ion battery.

17. The pulsed discharge device according to claim 1, wherein the time ratio is a value to reduce a decrease in discharged capacity and an increase in a cell temperature.

18. The pulsed discharge device according to claim 17, wherein the chemical battery is a lithium-ion battery.

19. The pulsed discharge device according to claim 1, wherein the chemical battery is a lithium-ion battery.

20. A pulsed discharge method, comprising:
performing a process of determining an interruption time to a discharge time based on a predetermined time ratio between the discharge time and the interruption time when performing a pulsed discharge to repeat alternately a discharge and a pause in discharging of a chemical battery, wherein the time ratio includes a plurality of time ratios that differ in type; and
determining the interruption time based on a larger time ratio between the plurality of time ratios.

* * * * *